United States Patent [19]

Bell, Jr. et al.

[11] 4,320,279
[45] Mar. 16, 1982

[54] PROGRAMMABLE PULSE GENERATOR FOR ELECTRICAL DISCHARGE MACHINING APPARATUS

[75] Inventors: Oliver A. Bell, Jr., Statesville; Randall C. Gilleland, Troutman; Davey J. Chance, Concord, all of N.C.

[73] Assignee: Colt Industries Operating Corp, New York, N.Y.

[21] Appl. No.: 68,328

[22] Filed: Aug. 21, 1979

[51] Int. Cl.³ .................................................. B23P 1/02
[52] U.S. Cl. .................................. 219/69 P; 219/69 C
[58] Field of Search ............................. 219/69 P, 69 C

[56] References Cited

U.S. PATENT DOCUMENTS

| | | | |
|---|---|---|---|
| 3,697,879 | 10/1972 | Holliday | 219/69 C |
| 3,809,848 | 5/1974 | Bell, Jr. | 219/69 C |
| 3,973,104 | 8/1976 | Ullmann et al. | 219/69 C |
| 3,996,445 | 12/1976 | Wohlabaugh | 219/69 C |
| 4,071,729 | 1/1978 | Bell, Jr. | 219/69 C |
| 4,078,163 | 3/1978 | Bell, Jr. et al. | 219/69 C |

*Primary Examiner*—C. C. Shaw
*Attorney, Agent, or Firm*—Harry R. Dumont

[57] ABSTRACT

Included in the circuit are a pair of counter timer circuits, a pair of inverters and a D-type flip flop. The inputs of the counters are tied to a programmable computer buss. A number is loaded into the first counter representative of machining power pulse on-time and a second number is loaded into the second counter representative of machining power pulse off-time.

As the first counter counts to 0, the pulse output from the first counter is passed through an inverter to the second counter to enable it. After the second counter counts to 0 there will be provided an output through the second inverter to initiate the operation of the first counter. The pulses which are produced at the termination of each count provide operation of a following flip-flop stage which is toggled to provide on-off time for the machining power pulses to the following power module of the electrical discharge machining apparatus.

4 Claims, 1 Drawing Figure

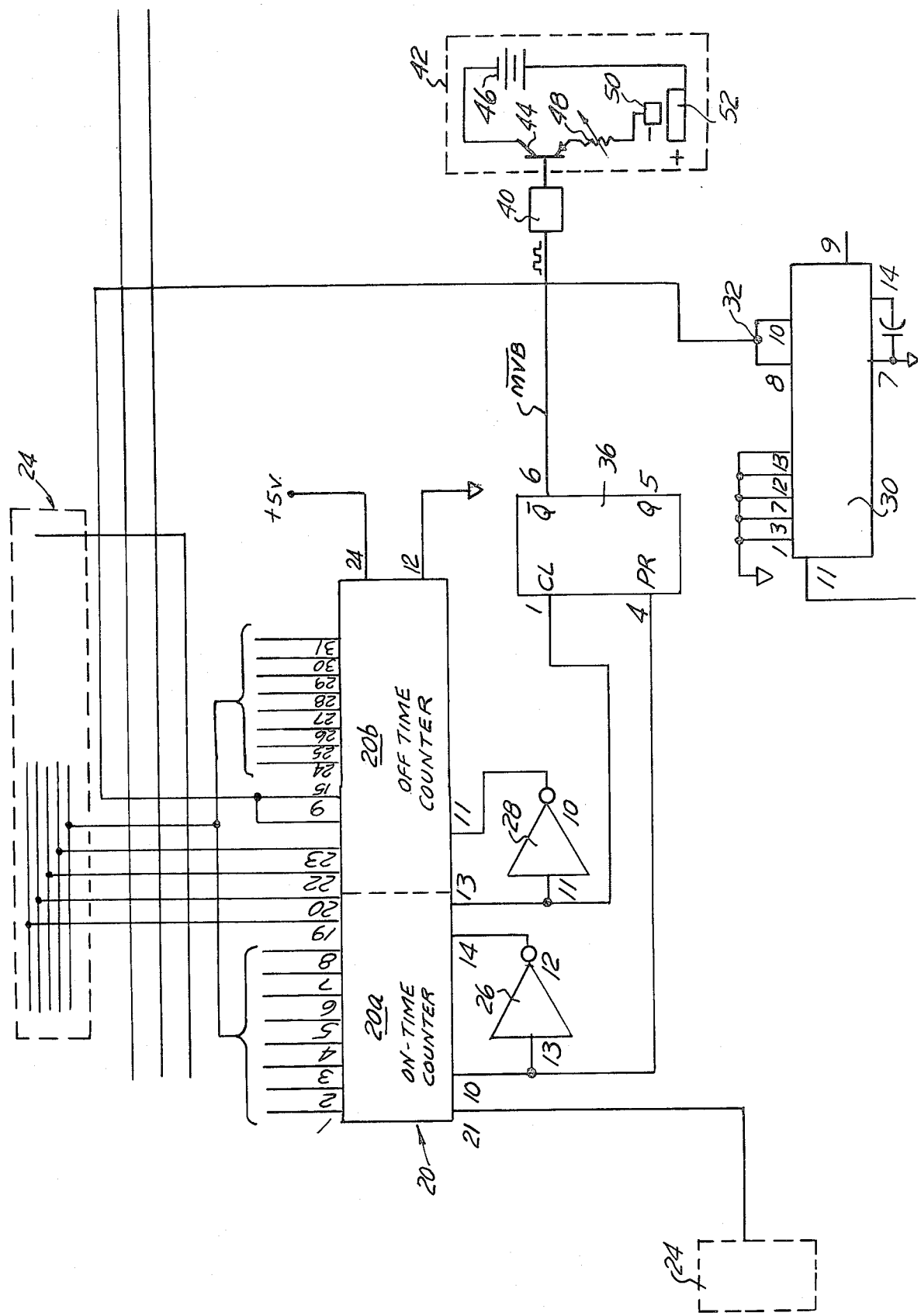

PROGRAMMABLE PULSE GENERATOR FOR ELECTRICAL DISCHARGE MACHINING APPARATUS

BACKGROUND OF THE INVENTION

The field to which the present invention relates is that generally known as electrical discharge machining, sometimes hereinafter referred to as EDM, in which material is removed from an electrically conductive workpiece by the action of electrical gap discharges occurring between a tool electrode and a workpiece. A dielectric coolant fluid is circulated and recirculated through the gap, usually under pressure, throughout the machining operation. An electrode or a workpiece servo feed system is used to provide relative movement and thus maintain an optimum gap spacing between the electrode and the workpiece as the workpiece material is being removed.

It is important to the process of EDM that the machining power pulses provided at the gap give closely and precisely controllable on-off time and frequency to insure repeatability of results and to provide appropriate cutting action for the type of operation being carried on. For example, with a roughing type operation, relatively low frequency, high current magnitude pulses would be used. With a finishing type machining operation, relatively high frequency, low current magnitude pulses would be used. Various types of pulse generators which have this capability have been developed and are in commercial use for EDM. One commonly used type of EDM power supply includes as a principal part of its machining power pulse generator an astable multivibrator in which on-off time and frequency are controlled and preset by a ganged capacitor and resistor arrangement. One example of this type of pulse generator is shown and described in Kurt H. Sennowitz, U.S. Pat. No. 3,649,802, issued on Mar. 14, 1972 for "Protective System for Electrical Discharge Machining Power Supply Circuit", which patent is of common ownership herewith. Other types of pulse generators are in use which include various arrangements and combinations of astable multivibrators, oscillators and the like to provide for machining power pulses of controllable duration and frequency.

More recent developments in EDM include digital type pulse generators such as the one shown and described in Oliver A. Bell, Jr., U.S. Pat. No. 3,809,848, issued on May 7, 1974 for "Digitally Controlled Power Supply for Electrical Discharge Machining Apparatus". This patent has reference to a pair of presettable counters using thumbwheel switches in which the on-time switch and off-time switch and associated counters are sequentially enabled. A data selector stage is required in the circuit to complete the operation.

A similar arrangement for a digital type EDM pulse generator is shown and described in Oliver A. Bell, Jr., U.S. Pat. No. 3,809,847, issued on May 7, 1974, for "Method and Apparatus for Electrical Discharge Machining".

A still further type of digital multivibrator is shown and described in Oliver A. Bell, Jr., U.S. Pat. No. 4,071,729, issued on Jan. 31, 1978, for "Adaptive Control System and Method for Electrical Discharge Machining". This patent shows an on and off time generator which receives inputs from a programmable computer and from this general arrangement provides machining power pulses to the machining gap. All the above noted patents are of common ownership herewith.

The present invention shows a digital type pulse generator that is particularly adaptable to control by a programmable computer or similar input device. The present invention further discloses a pulse generator in which the setting can be changed under computer control to operate and receive a new on or off time input without turning off the power supply and restarting it.

SUMMARY OF THE INVENTION

Our invention will be seen to provide a EDM pulse generator particularly adaptable for controlling, in a precisely accurate manner, the operation of an EDM apparatus. The present invention incorporates as certain of its components devices which are commercially available from a number of sources including Intel Corporation of Santa Clara, Calif.

One example of the component used is the Intel Model 8253 programmable interval timer which includes three independent 16 bit counter chips and operates up to 2 Mhz programmable counter modes, adaptable to count either binary or decimal. A further device used in the pulse generator is the Intel Model 74LS74, which operates as a flip-flop adapted to receive at its clear and preset inputs those pulses produced at the termination of count from each counter section of the pulse generator. The manner in which the aforementioned devices operate and are used will be made more clear in the following description of the circuit of the present invention.

BRIEF DESCRIPTION OF THE DRAWINGS

The present invention, its operation, features and advantages, and the advancements which it affords will be understood from the following specification together with the drawings in which like numerals are used to refer to similar or like parts where they occur, and wherein:

The drawing is a combined schematic and block diagrammatic showing of the invention.

DETAILED DESCRIPTION OF THE PREFERRED EMBODIMENT

The basic operating components of the circuit include the several counters of the interval counter type timer circuits 20. These may be of the type known as the Model 8253 manufactured by Intel and previously referred to. The counters 20 are designed to be written into and read from by an associated microprocessor or similar type programmable input device. One type of microprocessor particularly well designed for use in connection with the invention is the microprocessor currently manufactured and sold by the Mostek Corporation, 1215 West Crosby Road, Carrolton, Tex. 75006 and known as the Model MK 3880-4. Inputs and outputs for the counter 20 are provided by microprocessor busses indicated generally by the numeral 24 at the lefthand and upper margins of the drawing. The counter 20 is divided into a left hand section 20a and a right hand counter section 20b with the left hand section 20a being designed for on-time counting and the right hand section 20b for off-time counting. A pair of inverters are included in the circuit and are indicated by the numbers 26 and 28. The inverter 26 is connected between the pin 10 which is the output from the first or on-time counter section 20a of counter 20 and into the gate of the second or off-time counter section 20b of the counter 20b at pin 14. When the on-time counter 20a finishes its terminal countdown it will start the off-time counter counting. We also take the output of the off-time counter from pin 13 and tie it back through the inverter 28 to the gate of the on-time counter section of counter 20 at pin 11. A suitable clock pulse source 30 is included in the circuit and feeds a 2 Mhz pulse at its terminal 32 back to operate the counter 20. The 2 Mhz clock pulse frequency is used because there is a one clock period propagation between the time that the on-time counter stops and the off-time counter starts. A functional description of the pins used on the chips are as follows: Pins 1, 2, 3, 4, 5, 6, 7, and 8 are the data pins. Pin 1 if data bit 7, pin 2 is data bit 6, etc. through pin 8 being data bit 0. Pins 19 and 20 are the address lines, 19 being address 0 and 20 being address A-1. The combination of these two pins gives four distinct addresses, 0 through 3. Pin 22 is the read line and pin 23 the write line. These two pins thus control whether the microprocessor is going to read or write to the counter 20. Pins 9 and 15 are clock inputs for the on and off-time counters. Pin 21 is a chip select which tells the counter that the current address and data are valid for this particular operation. Pin 10 is the output of the on-time counter. Pin 14 is the gate for the off-time counter. Pin 13 is the output of the off-time counter. Pin 11 is the input for the on-time counter gate.

The flip-flop 36 receives on its pin 4 or preset input a signal at the end of the on-time count of the counter 20a. The flip-flop 36 receives at its upper input or clock terminal a signal indicating the end of the off-time count of counter 20b. Thus the flip-flop 36 is toggled to provide at its Q output a multivibrator "off" signal. According to this timing, this signal is provided as an input to a next following drive stage 40 which suitably amplifies and shapes the drive signal for the power module 42. Included in the power module 42 are one or more transistors 44, a main DC source 46, a current control rheostat 48, all of which are connected as shown to the tool electrode and the workpiece 52. In the operation of the pulse generator, the programmable counters used are all tied to the microprocessor buss with the on-time counter 20a being given the number representing on-time and the off-time counter 20b being given the number representing off-time. As each counter counts down to its terminal count to zero, its output will be passed through the associated inverter 26 or 28 and the other counter will be started to run. Otherwise stated, each time one of the counters finishes, its output will be used to trigger the other counters and this will go on back and forth so that they have a multivibrator type action.

It is possible anytime to change the on-time or off-time if desired, to provide from the computer buss 24 a new number for either the counter 20a or 20b. As the counter finishes counting its last number, the new number will get loaded and that will be the next one it will count. For example, if an 8 and a 2 are used for on-time and off-time, counter 20a will count 8 and 2 until the 8, for example, is changed to 9. It will then count 9 and 2 and stay there until changed and then continue to operate.

It will thus be seen that we have provided by our invention a pulse generator which consists of several programmable counter elements accurate to 1 Ms and readily programmable and changeable in its program in accordance with operating needs.

We claim:

1. A pulse generator for an electrical discharge machining apparatus including a power module associated with the machining gap for providing machining power pulses thereto, comprising:
    a programmable interval timer/counter having two counter sections, each having its respective gate input, one controlling machining power pulse on-time and the other controlling machining power pulse off-time;
    an inverter connected between the output of the first section and the gate input of the second counter section;
    a second like poled inverter connected between the output of the second section and the gate input of the first section, both of said counter sections being of the count to zero type; and
    a flip-flop having a pair of inputs and further having an on-time and off-time output, the output of said first counter section connected to one of the inputs of said flip-flop, the output of the other counter section connected to the other input of the flip-flop, the two outputs of the flip-flop operably connected to and controlling machining power pulses passed to said power module, said two counter sections each operable to receive a new data input from a microprocessor and thus render it effective following the operation of the other counter sections without interrupting the operation of the pulse generator.

2. The combination as set forth in claim 1 wherein a further amplifier and shaping stage is connected between the two outputs from said flip-flop and the power module.

3. The combination as set forth in claim 1 wherein said counter sections are each connected to associated data busses of said microprocessor for receiving further new data with respect to on-times and off-times duration therefrom.

4. The combination as set forth in claim 1 wherein said output module includes an electronic output switch and a DC power supply operably connected to the machining gap for providing such machining power pulses thereto.

* * * * *